(12) United States Patent
Yashiki (10) Patent No.: US 10,115,947 B2
(45) Date of Patent: Oct. 30, 2018

(54) SEPARATOR ROLL, METHOD FOR PRODUCING BATTERY, AND METHOD FOR PRODUCING SEPARATOR ROLL

(71) Applicant: Sumitomo Chemical Company, Limited, Tokyo (JP)

(72) Inventor: Daizaburo Yashiki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 295 days.

(21) Appl. No.: 15/066,598

(22) Filed: Mar. 10, 2016

(65) Prior Publication Data

US 2016/0268569 A1    Sep. 15, 2016

(30) Foreign Application Priority Data

Mar. 13, 2015 (JP) ................... 2015-050519
Feb. 24, 2016 (JP) ................... 2016-033629

(51) Int. Cl.
| | | |
|---|---|---|
| *H01M 2/16* | (2006.01) |
| *H01M 10/04* | (2006.01) |
| *B29C 53/56* | (2006.01) |
| *H01M 2/14* | (2006.01) |
| *B29L 31/34* | (2006.01) |

(52) U.S. Cl.
CPC ......... *H01M 2/1653* (2013.01); *B29C 53/562* (2013.01); *H01M 10/04* (2013.01); *B29L 2031/3468* (2013.01); *H01M 2/145* (2013.01); *H01M 2/166* (2013.01); *H01M 2/1686* (2013.01)

(58) Field of Classification Search
None
See application file for complete search history.

(56) References Cited

U.S. PATENT DOCUMENTS

| | | | |
|---|---|---|---|
| 2006/0073380 A1* | 4/2006 | Kim ................... | H01M 10/052 429/129 |
| 2012/0164538 A1 | 6/2012 | Inagaki et al. | |
| 2014/0322585 A1* | 10/2014 | Iizuka ................... | B65H 75/10 429/129 |
| 2014/0329117 A1* | 11/2014 | Kubota ............. | H01M 10/0587 429/66 |

FOREIGN PATENT DOCUMENTS

| | | |
|---|---|---|
| JP | H0839688 A | 2/1996 |
| JP | 4846882 B2 | 12/2011 |
| JP | 2013139340 A | 7/2013 |
| WO | 2013084988 A1 | 6/2013 |

OTHER PUBLICATIONS

Office Action dated Dec. 6, 2016 in JP Application No. 2016-033629.

* cited by examiner

*Primary Examiner* — Alix E Eggerding
(74) *Attorney, Agent, or Firm* — Panitch Schwarze Belisario & Nadel LLP (57) ABSTRACT

The present invention provides a separator roll (10) and the like including a core suited for reuse. The separator roll (10) includes: a porous separator (12) for use in a battery; and a core (8) around which the separator (12) is wound. The outer circumferential surface (S) of the core (8) has arithmetic mean roughness of not less than 3.7 μm, the outer circumferential surface (S) being in contact with the separator (12).

13 Claims, 8 Drawing Sheets

SEPARATOR ROLL, METHOD FOR PRODUCING BATTERY, AND METHOD FOR PRODUCING SEPARATOR ROLL

This nonprovisional application claims priority under 35 U.S.C. § 119 on Patent Application No. 2015-50519 filed in Japan on Mar. 13, 2015 and Patent Application No. 2016-033629 filed in Japan on Feb. 24, 2016, the entire contents of which are hereby incorporated by reference.

TECHNICAL FIELD

The present invention relates to (i) a separator roll for use in a battery such as a lithium ion battery, (ii) a method for producing a separator roll, and (iii) a method for producing a battery.

BACKGROUND ART

Inside a lithium-ion secondary battery, a cathode and anode are separated by a porous separator. The production of lithium-ion batteries utilizes a separator roll which includes the above separator and a cylindrical core around which the separator is wound.

Patent Literature 1 discloses a roll in which a microporous film is wound around a core that includes an electrically conductive component.

CITATION LIST

Patent Literature

[Patent Literature 1]
Japanese Patent Application Publication, Tokukai No. 2013-139340 (Publication date: Jul. 18, 2013)

SUMMARY OF INVENTION

Technical Problem

It is preferable that a core from which a separator has been wound off can be reused for the winding of another separator. Patent Literature 1 does not disclose such reuse of a core.

An object of the present invention is to provide (i) a separator roll including a core suited for reuse, (ii) a method for producing a separator roll, and (iii) a method for producing a battery including a separator that has been wound off from a separator roll.

Solution to Problem

In order to solve the above problem, a separator roll according to the present invention includes: a separator for use in batteries (hereinafter, "battery separator"), the battery separator being porous; and a core around which the battery separator is wound, the core having an outer circumferential surface, whose arithmetic mean roughness is not less than 3.7 μm, the outer circumferential surface being in contact with the battery separator.

Further, a separator roll according to the present invention includes: a battery separator being porous; and a core around which the battery separator is wound, the core having an outer circumferential surface whose root mean square roughness is not less than 4.0 μm, the outer circumferential surface being in contact with the battery separator.

The inventor of the present invention found that there was a correlation between (i) surface roughness (arithmetic mean roughness or root mean square roughness) of the outer circumferential surface of the core and (ii) peel strength, which is the amount of force required to peel an adhesive and a battery separator from the outer circumferential surface of the core. The inventor found that when the surface roughness meets specific conditions, the peel strength decreases markedly.

The configuration described above makes it possible to markedly decrease peel strength compared to that of the conventional cores. This makes it possible to easily peel an adhesive and a battery separator from the outer circumferential surface of a core, thus enabling reuse of the core.

Still further, the separator roll according to the present invention may be configured such that one end of the battery separator is fixed to the outer circumferential surface, the one end being in contact with the outer circumferential surface.

The configuration described above makes it possible to prevent misalignment of the battery separator on the outer circumferential surface of a core. Particularly, with the configuration in which one end of the battery separator is fixed to the outer circumferential surface of the core before the battery separator is wound around the core, it is possible to prevent the battery separator from displacing from a fixed position of the battery separator during winding of the battery separator around the core. This enables the provision of a separator roll that allows for reuse of a core and causes little winding misalignment.

Yet further, the separator roll according to the present invention may be configured such that the battery separator includes a functional layer facing the outer circumferential surface.

In a case where the adhesiveness of a functional layer is higher than that of other components of a battery separator, it is easy for the functional layer to adhere to and remain on the outer circumferential surface of a core. This can hinder reuse of the core.

The configuration described above allows for easy peeling of a functional layer from the outer circumferential surface of a core, and thus enables reuse of the core.

Further, the separator roll according to the present invention may be configured such that the core thereof may contain resin.

When an adhesive and a battery separator are peeled from the outer circumferential surface of a core, force is applied in the direction of peeling to the portion of the core on the outer circumferential surface side.

The configuration described above makes it difficult, in comparison with cores made of, for example, paper for the outer circumferential surface side of a core to be peeled off.

A battery according to the present invention includes a cathode, an anode, and the battery separator described above, the battery separator being (i) wound off from the abovementioned separator roll and (ii) arranged such that it is sandwiched between the cathode and anode.

A method for producing a battery according to the present invention includes the steps of (i) winding off the abovementioned battery separator from the abovementioned separator roll and (ii) arranging the abovementioned battery separator having been wound off such that it is sandwiched between a cathode and an anode.

The configuration described above enables reuse of the core of the separator roll and thus makes it possible to inexpensively provide (i) a separator roll and (ii) a battery separator that has been wound off from a separator roll. This makes it possible to provide a battery inexpensively in comparison to the conventional batteries.

A method for producing a separator roll according to the present invention includes the steps of (i) conveying a battery separator, the battery separator being porous; and (ii) winding the battery separator being conveyed around a core, the core having an outer circumferential surface whose arithmetic mean roughness is not less than 3.7 μm.

Further, the method for producing a separator roll according to the present invention includes the steps of (i) conveying a battery separator, the battery separator being porous and (ii) winding the battery separator being conveyed around a core, the core having an outer circumferential surface whose root mean square roughness of not less than 4.0 μm.

The above-described method makes it possible to produce a separator roll that allows for reuse of a core.

Advantageous Effects of Invention

A separator roll according to the present invention has the advantageous effect of enabling an adhesive and a battery separator to be easily peeled from an outer circumferential surface of a core, thus enabling reuse of the core.

Further, a battery according to the present invention has the advantageous effect of being able to be provided inexpensively in comparison to the conventional batteries.

Still further, a method for producing a separator roll according to the present invention has the advantageous effect of enabling production of a separator roll that allows for reuse of a core.

DESCRIPTION OF EMBODIMENTS

[Basic Configuration]

The following discusses, in order, a lithium-ion secondary battery, a separator, a heat-resistant separator, a method for producing the heat-resistant separator, a slitting apparatus, and a cutting device.

(Lithium-Ion Secondary Battery)

A nonaqueous electrolyte secondary battery, a lithium-ion secondary battery being a representative example thereof, has a high energy density. Due to this fact, nonaqueous electrolyte secondary batteries are currently widely used in such devices as personal computers, mobile phones, and mobile information terminals, as well as in motorized objects such as automobiles and aircraft. Nonaqueous electrolyte secondary batteries are also widely used as stationary batteries to contribute to a stable supply of power.

Figure 1:
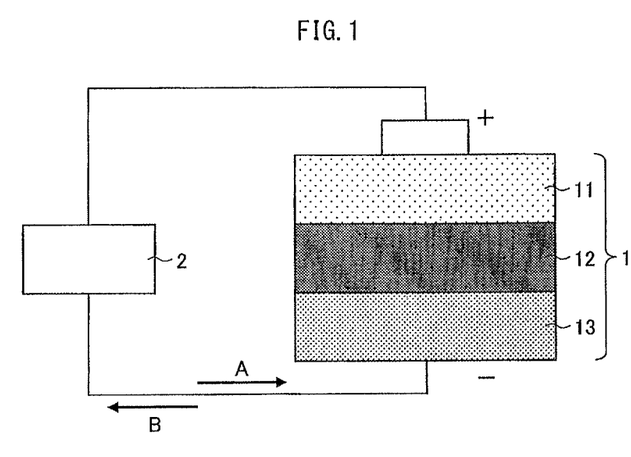
FIG. 1 is a schematic view illustrating a cross sectional configuration of a lithium-ion secondary battery.

FIG. 1 is a schematic view illustrating a cross sectional configuration of a lithium-ion secondary battery 1 (battery).

As illustrated in FIG. 1, the lithium-ion secondary battery 1 includes a cathode 11, a separator 12 (battery separator), and an anode 13. Outside the lithium-ion secondary battery 1, an external device 2 is connected to the cathode 11 and the anode 13. While the lithium-ion secondary battery 1 is being charged, electrons move in direction A. On the other hand, while the lithium-ion secondary battery 1 is being discharged, electrons move in direction B.

(Separator)

The separator 12 is arranged such that it is sandwiched between the cathode 11, which is a positive electrode of the lithium-ion secondary battery 1, and the anode 13, which is a negative electrode of the lithium-ion secondary battery 1. The separator 12 is a porous film that separates the cathode 11 and the anode 13 while allowing lithium ions to move therebetween. The separator 12 contains, for example, polyolefin such as polyethylene or polypropylene as a component material.

Figure 2:
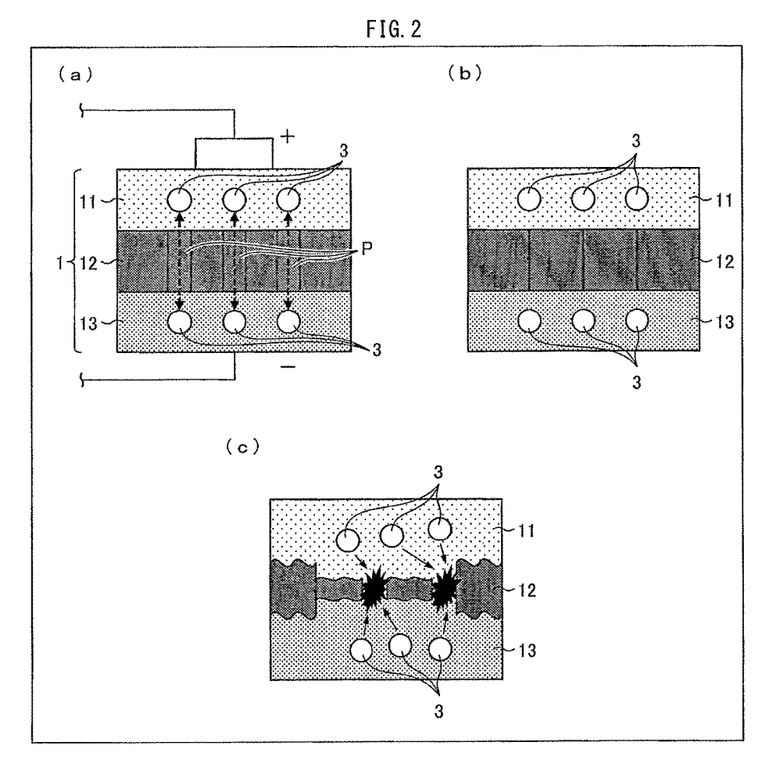
FIG. 2 is a schematic view illustrating details of the configuration of the lithium-ion secondary battery illustrated in FIG. 1.

FIG. 2 is a schematic view illustrating details of the configuration of the lithium-ion secondary battery 1 illustrated in FIG. 1. (a) of FIG. 2 illustrates a configuration of the lithium-ion secondary battery 1 in a normal state. (b) of FIG. 2 illustrates a state in which the temperature of the lithium-ion secondary battery 1 has risen. (c) of FIG. 2 illustrates a state in which the temperature of the lithium-ion secondary battery 1 has risen sharply.

As illustrated in (a) of FIG. 2, the separator 12 is provided with many pores P. Normally, lithium ions 3 in the lithium-ion secondary battery 1 can move back and forth through the pores P.

However, there are cases in which the temperature of the lithium-ion secondary battery 1 rises due to, for example, excessive charging of the lithium-ion secondary battery 1, a high current caused by short-circuiting of the external device, or other such causes. In such cases, the separator 12 melts or softens, and the pores P are blocked, as illustrated in (b) of FIG. 2. As a result, the separator 12 shrinks. This stops the abovementioned movement of the lithium ions 3, and consequently stops the abovementioned temperature rise.

However, in a case where the temperature of the lithium-ion secondary battery 1 rises sharply, the separator 12 shrinks suddenly. In such a case, as illustrated in (c) of FIG. 2, the separator 12 may be destroyed. The lithium ions 3 would then leak out from the destroyed separator 12. As a result, the lithium ions 3 do not stop moving. Consequently, the temperature of the battery continues rising.

(Heat-Resistant Separator)

Figure 3:
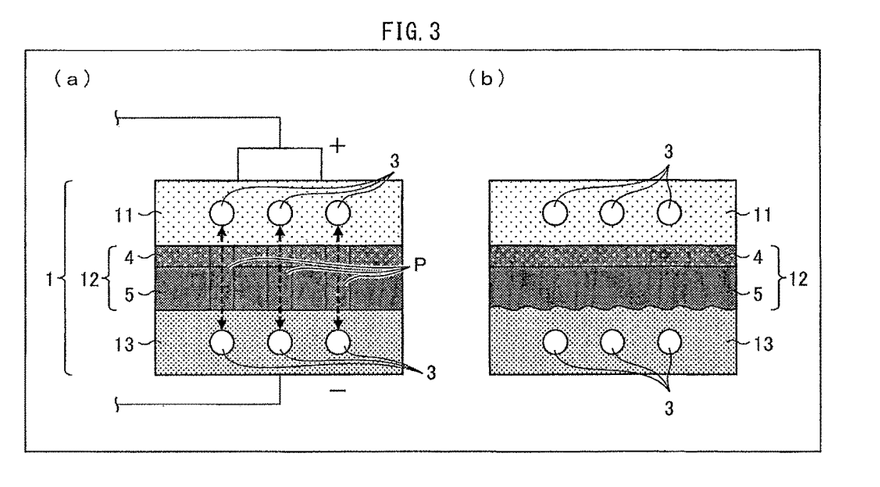
FIG. 3 is a schematic view illustrating another configuration of the lithium-ion secondary battery illustrated in FIG. 1.

FIG. 3 is a schematic view illustrating another configuration of the lithium-ion secondary battery 1 illustrated in FIG. 1. (a) of FIG. 3 illustrates a configuration of the lithium-ion secondary battery 1 in a normal state, and (b) of FIG. 3 illustrates a state in which the temperature of the lithium-ion secondary battery 1 has risen sharply.

As illustrated in (a) of FIG. 3, the separator 12 may be a heat-resistant separator that includes a porous film 5 and a heat-resistant layer 4. The heat-resistant layer 4 is layered upon one surface of the porous film 5, the one surface being on the cathode 11 side. Note that the heat-resistant layer 4 can alternatively be layered upon one surface of the porous film 5, the one surface being on the anode 13 side, or upon both surfaces of the porous film 5. The heat-resistant layer 4 is provided with pores which are similar to the pores P of the separator 12. Normally, the lithium ions 3 move back and forth through the pores P of the separator 12 and the pores of the heat-resistant layer 4. The heat-resistant layer 4 contains, for example, wholly aromatic polyimide (aramid resin) as a component material.

As illustrated in (b) of FIG. 3, even in a case where the temperature of the lithium-ion secondary battery 1 sharply rises and, the porous film 5 melts or softens as a result, the shape of the porous film 5 is maintained because the heat-resistant layer 4 supports the porous film 5. Therefore, such a sharp temperature rise would result in only melting or softening of the porous film 5 and consequent blocking of the pores P. This stops movement of the lithium ions 3 and consequently stops the above-described excessive discharging or excessive charging. In this way, destruction of the separator 12 can be prevented.

(Steps of Production of Heat-Resistant Separator)

A method of producing the heat-resistant separator of the lithium-ion secondary battery 1 is not particularly limited. The heat-resistant separator can be produced using a known method. The following discussion assumes a case where the porous film 5 contains polyethylene as a main component material. However, even in a case where the porous film 5 contains some other material, similar steps can still be used to produce the separator 12.

For example, it is possible to employ a method including (i) a step of forming a film by adding a plasticizer to a thermoplastic resin, and (ii) a subsequent step of removing the plasticizer with an appropriate solvent. For example, in a case where the porous film 5 is made of a polyethylene resin containing ultrahigh molecular weight polyethylene, it is possible to produce the porous film 5 via the following method.

This method includes (1) a kneading step in which a polyethylene resin composition is obtained by kneading an ultrahigh molecular weight polyethylene and an inorganic filler such as calcium carbonate, (2) a rolling step in which a film is formed with the polyethylene resin composition, (3) a removal step in which the inorganic filler is removed from the film obtained in the step (2) above, and (4) a stretching step in which the porous film 5 is obtained by stretching the film obtained in the step (3) above.

Through the removal step, many fine pores are created in the film. The fine pores of the film stretched in the stretching step become the above-described pores P. The porous film 5 formed as a result is a polyethylene microporous film having a prescribed thickness and a prescribed air permeability.

Note that in the kneading step, 100 parts by weight of the ultrahigh molecular weight polyethylene, 5 parts by weight to 200 parts by weight of a low-molecular weight polyolefin having a weight-average molecular weight of 10,000 or less, and 100 parts by weight to 400 parts by weight of the inorganic filler may be kneaded.

Thereafter, in a coating step, the heat-resistant layer 4 is formed on a surface of the porous film 5. For example, on the porous film 5, an aramid/NMP (N-methylpyrrolidone) solution (coating solution) is applied, and thereby, the heat-resistant layer 4 that is an aramid heat-resistant layer is formed. The heat-resistant layer 4 may be provided on only one surface or on both surfaces of the porous film 5. The heat-resistant layer 4 may alternatively be formed with a coating using a mixed solution containing a filler such as alumina/carboxymethyl cellulose.

The method for coating the porous film 5 with a coating solution is not particularly limited as long as it is a method that enables uniform wet coating. The method may be a conventional and well-known method such as a capillary coating method, a spin coating method, a slit die coating method, a spray coating method, a dip coating method, a roll coating method, a screen printing method, a flexo printing method, a bar coater method, a gravure coater method, or a die coater method. The thickness of the heat-resistant layer 4 can be controlled by adjusting (i) the thickness of a coating wet film and (ii) the concentration of solid content in the coating solution.

It is possible to use a resin film, a metal belt, a drum or the like as a support by which the porous film 5 is fixed or conveyed during coating.

As described above, it is possible to produce a separator 12 (heat-resistant separator) in which a heat-resistant layer 4 is layered upon a porous film 5. The separator thus produced is wound around a cylindrical core. Note that the object to be produced via the above production method is not limited to being a heat-resistant separator. The above production method does not necessarily include the coating step. In a case where the production method includes no coating step, the object to be produced is a separator including no heat-resistant layer. Additionally, an adhesion separator including some other functional layer (for example, an adhesion layer as described later) instead of the heat-resistant layer may be produced via the same production method as the heat-resistant separator.

(Slitting Apparatus)

The heat-resistant separator and the separator including no heat-resistant layer (both types of separator hereinafter referred to as "separator") preferably have a width (hereinafter, "product width") suitable for products in which the separator will be utilized, such as the lithium-ion secondary battery 1. However, in order to improve productivity, the separator is produced so as to have a width that is equal to or larger than the abovementioned product width. Then, after having been thus produced, the separator is slit into a separator(s) of a width equal to the product width.

Note that "separator width" means a dimension of the separator in a direction substantially perpendicular to both the lengthwise direction and the thicknesswise direction of the separator. In the description below, a wide separator having not yet been slit is referred to as an "original sheet," while a separator having been slit is specifically referred to as a "slit separator". Note also that here, the term "slit" means to slit the separator in the lengthwise direction (the direction of the flow of the film during production; MD: Machine Direction), and that the term "cut" means to cut the separator in a transverse direction (TD). The transverse direction (TD) means a direction which is substantially perpendicular to the lengthwise direction (MD) and the thicknesswise direction of the separator.

Figure 4:
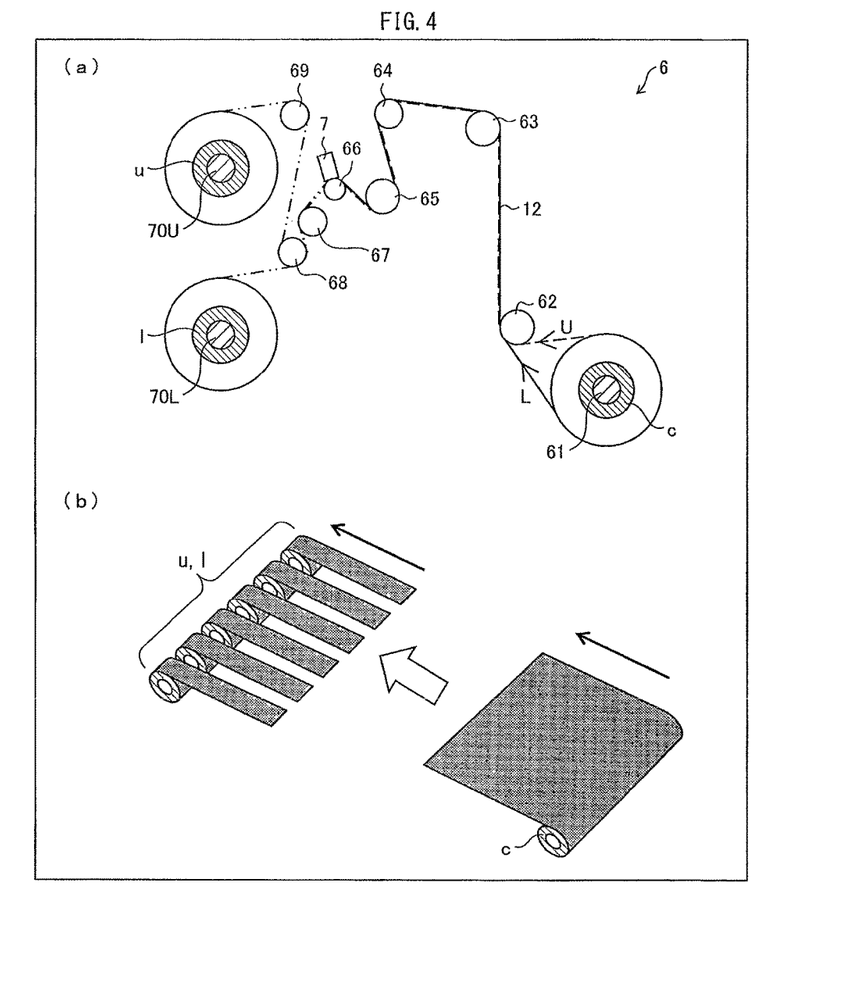
FIG. 4 is a schematic view illustrating a configuration of a slitting apparatus for slitting a separator.

FIG. 4 is a schematic view illustrating a configuration of a slitting apparatus 6 for slitting a separator. (a) of FIG. 4 illustrates an overall view of a configuration of a slitting apparatus, and (b) of FIG. 4 illustrates configurations before and after slitting the original sheet.

As illustrated in (a) of FIG. 4, the slitting apparatus 6 includes a cylindrical wind-off roller 61 that is supported such that it can rotate, rollers 62 to 69, and take-up rollers 70U and 70L. The slitting apparatus 6 is further provided with a cutting device 7 described later.

(Before Slitting)

In the slitting apparatus 6, a cylindrical core c around which the original sheet is wound is fit on the wind-off roller 61. As illustrated in (b) of FIG. 4, the original sheet is wound off from the core c to route U or route L. The original sheet thus wound off is conveyed to the roller 68 via the rollers 63 to 67. During the step of conveying the unwound original sheet, the original sheet is slit into a plurality of slit separators.

(After Slitting)

As illustrated in (b) of FIG. 4, some of the slit separators are each wound around cylindrical cores u (bobbins) fit on the take-up roller 70U. Meanwhile, the other slit separators are each wound around cylindrical cores 1 (bobbins) fit on the take-up roller 70L. Note that each of the separators wound into a roll form is referred to as a "separator roll."

(Cutting Device)

Figure 5:
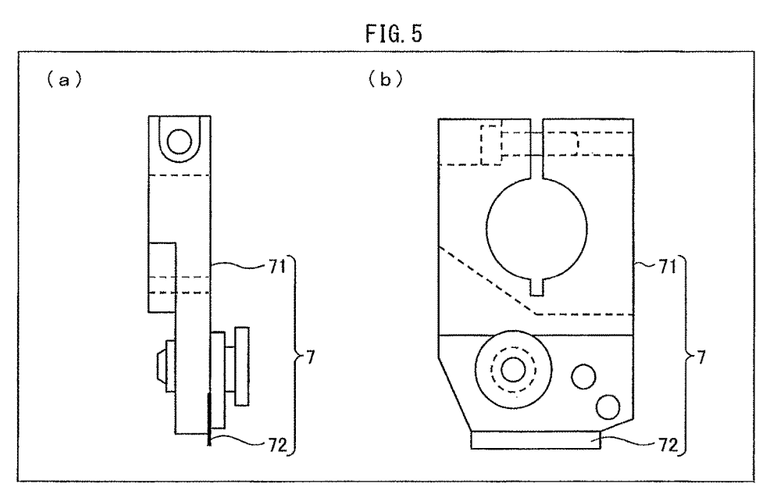
FIG. 5 is a combination of a side view and a front view illustrating a configuration of a cutting device of the slitting apparatus illustrated in FIG. 4.

FIG. 5 illustrates a configuration of the cutting device 7 of the slitting apparatus 6 illustrated in (a) of FIG. 4. (a) of FIG. 5 is a side view of the cutting device 7, and (b) of FIG. 5 is a front view of the cutting device 7.

As illustrated in (a) and (b) of FIG. 5, the cutting device 7 includes a holder 71 and a blade 72. The holder 71 is fixed to a housing or the like provided in the slitting apparatus 6. The holder 71 holds the blade 72 in a manner such that the blade 72 and the original sheet of the separator being conveyed have a fixed positional relation. The blade 72 (i) has a finely sharpened edge and (ii) slits the original sheet of the separator by using the edge.

Embodiment

Configuration of Separator Roll

Figure 6:
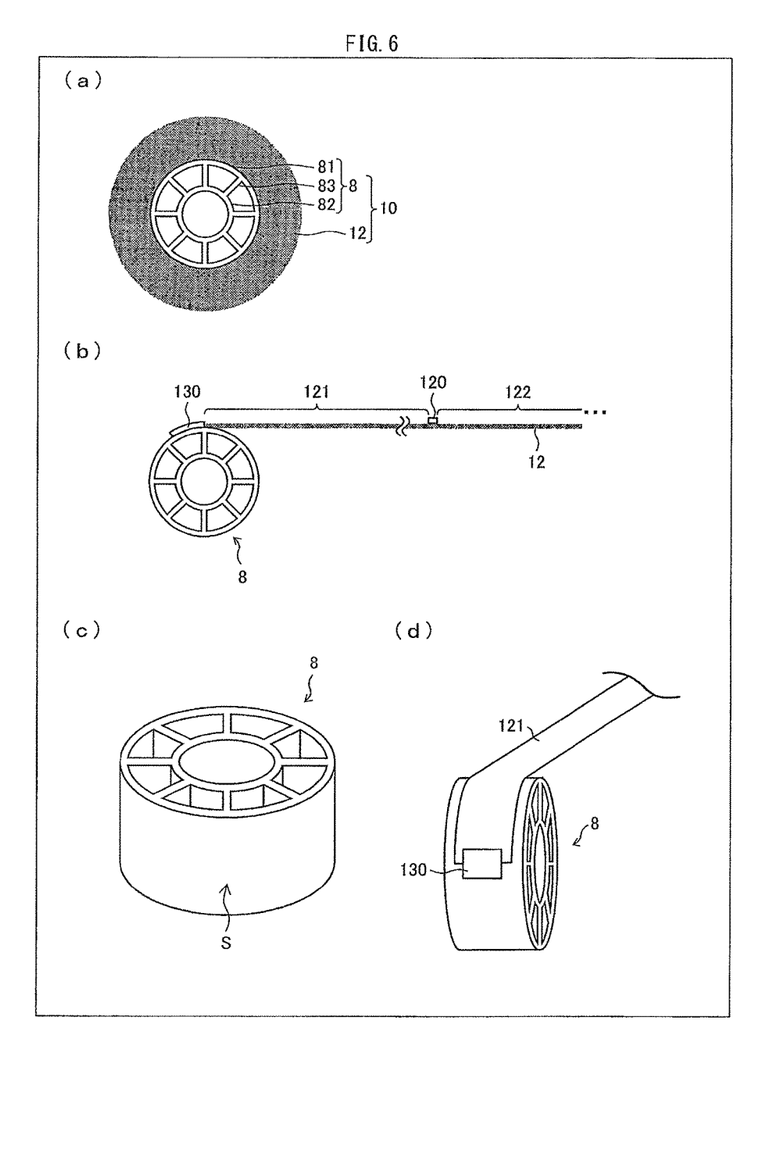
FIG. 6 is a schematic view illustrating a configuration of a separator roll in accordance with an embodiment of the present invention.

FIG. 6 is a schematic view illustrating a configuration of a separator roll 10 according to an embodiment of the present invention. (a) of FIG. 6 shows a separator 12 in a state before being wound off a core 8. (b) of FIG. 6 shows the separator 12 in a state in which it has been wound off from the core 8. (c) of FIG. 6 shows the core 8 in a state after the separator 12 has been wound off and removed. (d) of FIG. 6 shows the illustration of (b) of FIG. 6 from a different angle.

As is shown in (a) of FIG. 6, the separator roll 10 includes a core 8 with a separator 12 wound thereon. The separator 12 is one of the slit separators into which the original sheet of the separator has been slit as described above.

(Core)

The core 8 includes an outer cylindrical part 81, an inner cylindrical part 82, and ribs 83. The core 8 has the same function as the cores u and l mentioned above.

The outer cylindrical part 81 is a cylindrical member for winding a separator 12 around the outer circumferential surface of the outer cylindrical part 81. The inner cylindrical part 82 is a cylindrical member for fitting a take-up roller to the inner circumferential surface of the inner cylindrical part 82. The ribs 83 are support members that support the outer cylindrical part 81 from the inner circumferential surface thereof, the ribs 83 extending between the inner circumferential surface of the outer cylindrical part 81 and the outer circumferential surface of the inner cylindrical part 82.

A material for the core 8 includes ABS resin. However, the material for the core according to the present invention is not limited to the above. The material for the core may include resins other than ABS resin, such as polyethylene resin, polypropylene resin, polystyrene resin, and vinyl chloride resin. It is preferable that metal, paper, and/or fluorocarbon resin are not used as the material for the core.

(Separator)

As shown in (b) of FIG. 6, tape 120 is provided on the outer surface of the separator 12 and serves as a marker that indicates the end of the product. Normally, such tape is often provided as a marker. However, a seal, a stamp, or a printed marker may be provided instead. The surface provided with the tape 120 is not limited to being the outer surface of the separator 12 and may be the inner surface thereof.

The separator 12 is divided into (i) an inner portion 121, which is the portion closer to the core 8 than the tape 120 and (ii) an outer portion 122, which is the portion further from the core 8 than the tape 120. One end of the separator 12 is affixed to the core 8 via adhesive tape 130. Specifically, the abovementioned one end of the separator 12 is fixed to the outer circumferential surface S of the core 8 via adhesive tape 130, the adhesive tape 130 including an adhesive agent. The one end of the separator may be fixed to the outer circumferential surface S by means of directly applying an adhesive to the abovementioned one end of the separator 12, by using a clip, or in some other way other than using the adhesive tape 130.

Unevenness of the outer circumferential surface of the core 8 is transferred to the separator 12. This unevenness is more easily transferred to the inner portion 121 than to the outer portion 122. Because of this, when the separator 12 is used as a part of a battery, the outer portion 122, which is separated from the inner portion 121 by means of the tape 120, is used.

The inner portion 121 is 3 m in length. However, the length of the inner portion of the separator according to the present invention is not limited to being 3 m.

The inventor of the present invention found that that there was a correlation between (i) surface roughness (for example, the arithmetic mean roughness Ra, or root mean square roughness Rq) of the outer circumferential surface S of the core 8 and (ii) peel strength, which is the amount of force required to peel the adhesive (adhesive tape 130) and the separator 12 from the outer circumferential surface S. The inventor further found that when the surface roughness meets specific conditions, the peel strength decreases markedly, thus enabling the core 8 to be reused easily. Below is an explanation of the surface roughness, followed by an explanation of the peel strength.

(Surface Roughness of the Core)

Figure 7:
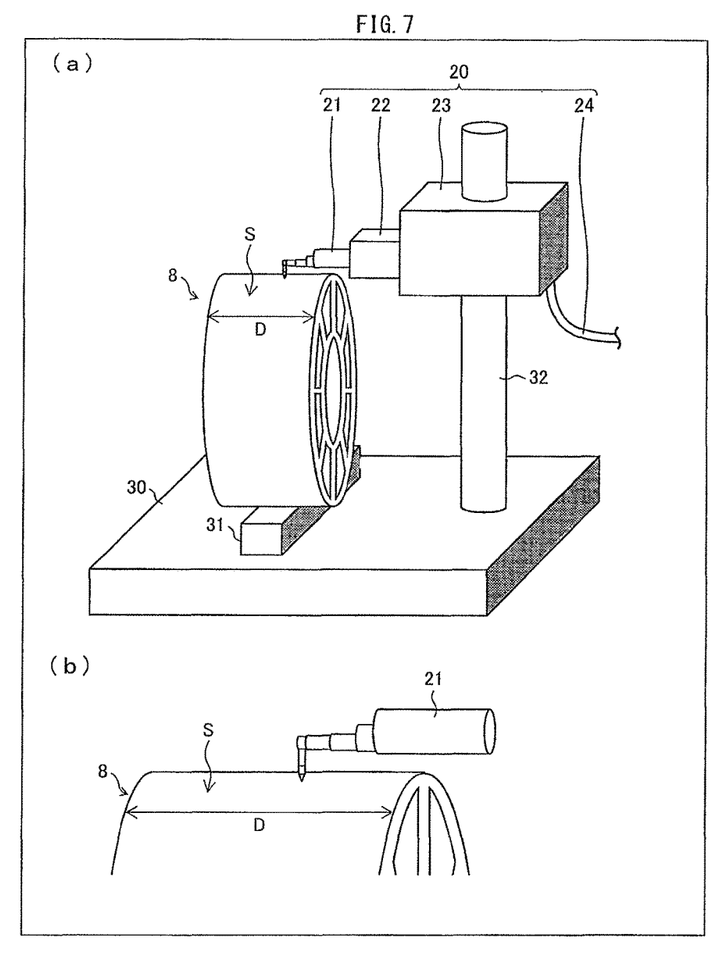
FIG. 7 is a schematic view illustrating a configuration for measuring the surface roughness of the outer circumferential surface of the core shown in FIG. 6.

FIG. 7 is a schematic view illustrating a configuration for measuring the surface roughness of the outer circumferential surface S of the core 8 shown in (c) of FIG. 6. (a) of FIG. 7 is an overall view of a configuration. (b) of FIG. 7 illustrates a configuration of a peripheral portion of a measurement head 21. As shown in (a) and (b) of FIG. 7, the surface roughness of the outer circumferential surface S of the core 8 is measured using a surface roughness measurement apparatus 20. As shown in (a) of FIG. 7, the core 8 is kept in a fixed position on a mount 30 via a chock 31.

The surface roughness measurement apparatus 20 includes a measurement head 21, a movement mechanism 22, a housing 23, and a cable 24. The surface roughness measurement apparatus 20 is fixed to the mount 30 via a fixing member 32.

The tip of the measurement head 21 is in contact with the outer circumferential surface S. The movement mechanism 22 moves the measurement head 21 in direction D, the width direction of the core 8. The housing 23 includes a module that (i) receives a signal corresponding to the surface roughness of the outer circumferential surface S from the measurement head 21, then (ii) calculates the surface roughness based on the signal thus received. The cable 24 relays electrical power and a result of the surface roughness calculation between the surface roughness measurement apparatus 20 and an external device.

(Specifications of Core Surface Roughness Measurement Apparatus)

The "Surftest (SJ-400)" manufactured by Mitutoyo was used as the surface roughness measurement apparatus 20. The tip of the probe of the measurement head 21 is cone-shaped, with an angle of 60 degrees. The radius of the tip of the probe is 2 μm. In the present embodiment, the surface roughness measurement apparatus 20 was set to the following settings. Measurement force=0.75 mN; measurement speed=0.5 mm/s; evaluation length=4.0 mm; cutoff value=0.8 mm.

(Peel Strength of Separator)

When the separator 12 is wound off, as shown in (b) of FIG. 6, from the separator roll 10 shown in (a) of FIG. 6, and is then peeled off the outer circumferential surface S of the core 8 as shown in (c) of FIG. 6, tensile force is applied to the separator 12. The amount of this tensile force is the peel strength of the separator 12, i.e., the amount of force required to peel the separator 12 from the outer circumferential surface S.

(Peel Strength of Adhesive Tape)

As shown in (d) of FIG. 6, the adhesive tape 130 affixes one end of the inner portion 121 of the separator 12 to the core 8. When the separator 12 is wound off, as shown in (b) of FIG. 6, from the separator roll 10 shown in (a) of FIG. 6, and the adhesive tape 130 is peeled off the outer circumferential surface S of the core 8 as shown in (c) of FIG. 8, tensile force is applied to the adhesive tape 130. Normally, this tensile force is the force used to peel the adhesive tape 130 from the outer circumferential surface S in a state where the peel angle, i.e., the angle formed by (i) a peeled part of the adhesive tape 130 which part has been peeled from the outer circumferential surface S and (ii) a plane tangent to a part of the outer circumferential surface S which part corresponds to a yet-to-be peeled portion of the adhesive tape 130, is 90 degrees or greater. The amount of this tensile force is the peel strength of the adhesive tape 130, i.e., the amount of force required to peel the adhesive tape 130 from the outer circumferential surface S.

Note that the force of adhesion between the adhesive tape 130 and the outer circumferential surface S is proportional to the area of adhesion (i.e., the area of the portion of the adhesive tape 130 adhering to the outer circumferential surface S). When the peel angle nears 0 degrees, the abovementioned tensile force is proportional to this area of adhesion. However, when the peel angle nears 90 degrees, the tensile force is proportional to the width of the adhesive tape 130.

(Quantification of Peel Strength)

In the discussion below, the abovementioned peel strength is quantified as the force required to peel the adhesive tape from the core 8.

Figure 8:
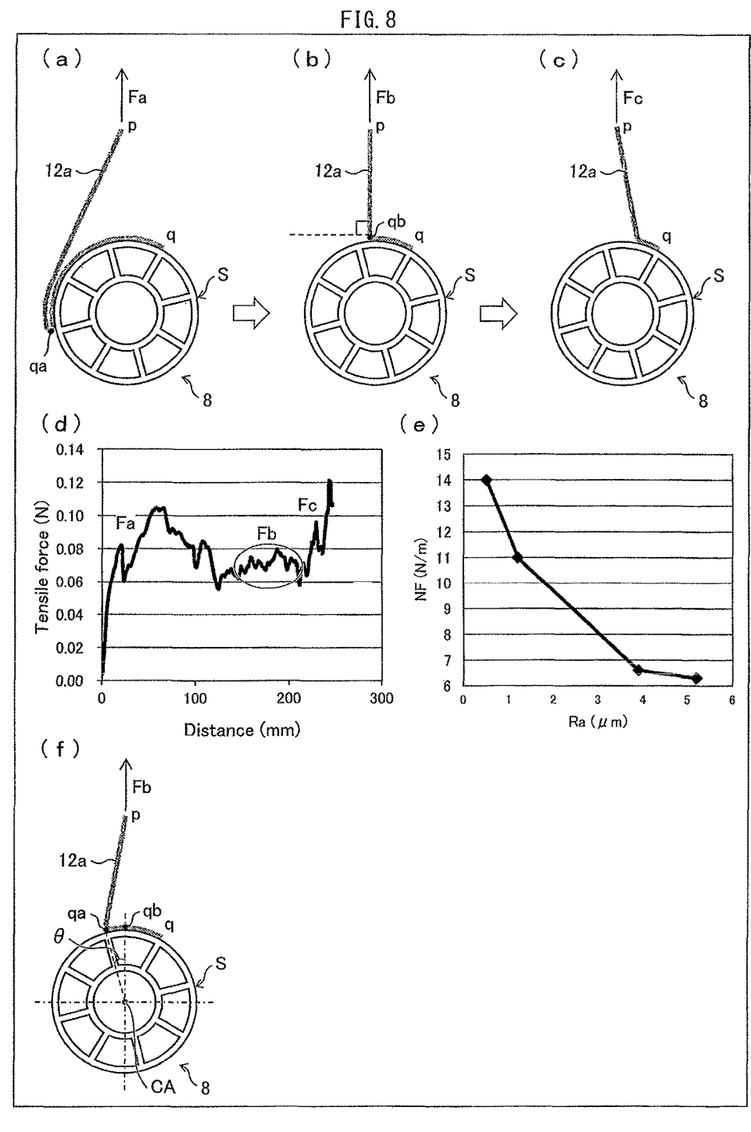
FIG. 8 is a combination of (i) a schematic diagram illustrating a configuration for measuring the tensile force applied to adhesive tape affixed to the outer circumferential surface of the core shown in FIG. 6, the tensile force being applied when the adhesive tape is peeled, and (ii) graphs showing results of the tensile force measurement.

FIG. 8 shows a configuration for measuring the tensile force applied to adhesive tape 12a when the adhesive tape 12a, being affixed to the outer circumferential surface S of the core 8 shown in (c) of FIG. 6 in the circumferential direction, is peeled therefrom. FIG. 8 also shows a result of the above tensile force measurement. (a) to (c) of FIG. 8 are schematic diagrams illustrating a state of the adhesive tape 12a when it is peeled from the core 8. (d) of FIG. 8 is a graph showing the relation between distance and tensile force, while (e) of FIG. 8 is a graph showing the relation between arithmetic mean roughness Ra and normalized peel strength NF. (f) of FIG. 8 is a schematic diagram illustrating a state in which average tensile force is being measured.

The adhesive tape 12a is "Scotch (Cat. No. 500-3-1235-10P; width=12 mm)" manufactured by 3M. The testing machine used for measuring tensile force was the "Tensilon Universal Material Testing Machine" (manufactured by Orientec, model RTG-1310). Peel strength tests were conducted three times for each sample, and test results were averaged for each sample to obtain final peel strength values.

It is possible quantify peel strength by measuring the tensile force applied to the adhesive tape 12a when the adhesive tape 12a, being affixed to the outer circumferential surface 5, is peeled therefrom, as shown in (a) to (c) of FIG. 8. Below is a detailed explanation of the peel strength quantification.

As shown in (a) of FIG. 8, the adhesive tape 12a is affixed to the outer circumferential surface S. Note that that prior to this affixation, ethanol was used to wipe off dirt, oil, and the like adhe ing to the outer circumferential surface S of the core 8. The adhesive tape 12a is 12 mm in width as mentioned above. A portion of the adhesive tape 12a, which portion has a length equaling three-eighths of the circumference of the core 8, is affixed to the core 8. From this state, tensile force is applied to an end p of the adhesive tape 12a in a direction substantially perpendicular to the outer circumferential surface S.

The distance represented by the horizontal axis in (d) of FIG. 8 is the distance in millimeters that a peeled portion of the adhesive tape 12a, which portion has been peeled from the outer circumferential surface S of the core 8, is pulled up. Pulling up of the adhesive tape 12a is performed at a speed of 100 mm/min. The tensile force is increased from a starting amount of 0 N, and once the tensile force exceeds a certain value, the adhesive tape 12 begins to be peeled off from the outer circumferential surface S. Tensile force Fa is the tensile force applied immediately after the adhesive tape 12a begins to be peeled from the circumferential surface S.

As shown in (b) of FIG. 8, the adhesive tape 12a continues to be peeled from the outer circumferential surface S further than is shown in (a) of FIG. 8. Tensile force Fb is the tensile force applied to the end p of the adhesive tape 12a during so-called 90-degree peeling, i.e., when (i) the direction in which the peeled portion of the adhesive tape 12a, which portion has been peeled from the outer circumferential surface S, extends, and (ii) the direction perpendicular to the outer circumferential surface S are identical. At this time, the following are recorded: (i) the distance that the adhesive tape 12a is pulled up until a 90-degree angle is formed by the peeled part of the adhesive tape 12 and the outer circumferential surface S, and (ii) the elapsed time until the abovementioned 90-degree angle is formed. Here, an average of tensile forces measured when the peeling angle is in a certain range including 90 degrees as described below is specified as tensile force Fb. During the measurement, the core 8 is fixed such that it does not move or rotate.

Specifically, a position qa, which in the state shown in (a) of FIG. 8 represents the border between (i) a portion of the adhesive tape 12a that has been peeled from the outer circumferential surface S and (ii) a portion of the adhesive tape 12a that has not been peeled from the outer circumferential surface S, moves to a position qb in the state shown in (b) of FIG. 8.

As shown in (f) of FIG. 8, in this process, angle θ, which is an angle formed by (i) a segment of an imaginary line connecting a point representing the position qa and a point passing through a rotational axis CA of the core 8 and (ii) a segment of an imaginary line connecting a point representing the position qb and a point passing through the rotational axis CA of the core 8, changes from being greater than 30 degrees to being 0 degrees. Tensile force Fb is an average tensile force during the period in which the angle θ changes from 30 degrees to 0 degrees (including 0 degrees).

Note that in the state shown in (b) of FIG. 8, the adhesive tape 12a has a length of 60 cm or more. For example, in a case where the core 8 has an outside diameter of 6 inches (152 mm), when angle θ changes from 30 degrees to 0 degrees, the portion of the adhesive tape 12a to be peeled from the outer circumferential surface S has a length of 40 mm. The average speed when the position qa moves along the outer circumferential surface S to the position qb is, for example, 100 mm/min. The elapsed time during this movement is, for example, 24 seconds.

As shown in (c) of FIG. 8, the adhesive tape 12a continues to be peeled from the outer circumferential surface S further than is shown in (b) of FIG. 8. Tensile force Fc is tensile force prior to when the peeling of the end part q of the adhesive tape 12a from the circumferential surface S finishes.

As shown in (d) of FIG. 8, the tensile force changes in an order of Fa, Fb, and Fc. This change reflects the state of the outer circumferential surface S. A greater tensile force indicates greater difficulty in peeling the adhesive tape 12a from the outer circumferential surface S. Similarly, a greater tensile force indicates greater difficulty in peeling the abovementioned separator 12 from the outer circumferential surface S.

(Relationship Between Surface Roughness and Peel Strength)

TABLE 1

| | Ra (μm) | Rq (μm) | F (N) | NF (N/m) |
|---|---|---|---|---|
| Comparative Example 1 | 0.5 | 0.6 | 0.17 | 14 |
| Comparative Example 2 | 1.2 | 1.4 | 0.13 | 11 |
| Example 1 | 3.9 | 4.8 | 0.079 | 6.6 |
| Example 2 | 5.2 | 6.3 | 0.075 | 6.3 |
| Example 3 | 13.1 | 15.7 | 0.068 | 5.7 |

Table 1 shows the relationship between measured values for arithmetic mean roughness Ra, root mean square roughness Rq, peel strength F, and normalized peel strength NF with varying cores.

The arithmetic mean roughness Ra and root mean square roughness Rq shown in Table 1 were both measured using the surface roughness measurement apparatus 20. The values for the peel strength F are averages of tensile force Fb measurements made for Comparative Examples 1 and 2 and Examples 1 to 3, in which cores of varying surface roughness values were used, in the configuration illustrated in (a) to (c) of FIG. 8. The tensile force Fb measurements were conducted three times for each of the examples. The normalized peel strength NF is tensile force Fb per unit width (m) of the adhesive tape 12a in the transverse direction of the adhesive tape 12a.

As shown in (e) of FIG. 8, the normalized peel strength NF decreases markedly as the surface roughness nears a value for the arithmetic mean roughness Ra in Example 1.

(Transfer of Unevenness of Core to Separator)

TABLE 2

| | Ra of core (μm) | Rq of core (μm) | Ra of separator (μm) | | | | | | | |
|---|---|---|---|---|---|---|---|---|---|---|
| | | | Reference | 1st layer | 2nd layer | 3rd layer | 4th layer | 5th layer | 6th layer | 12th layer |
| Com. Ex. 2a | 1.2 | 1.4 | 0.3 | 0.4 | — | — | — | — | — | 0.3 |
| Ex. 1a | 3.9 | 4.8 | 0.3 | 1.1 | 0.9 | 0.6 | 0.4 | 0.3 | 0.3 | 0.3 |
| Ex. 2a | 5.2 | 6.3 | 0.3 | 1.2 | 1.0 | 0.7 | 0.5 | 0.4 | 0.3 | 0.3 |
| Ex. 3a | 13.1 | 15.7 | 0.3 | 2.0 | — | — | — | — | — | 0.5 |

Table 2 shows the results of measurement of the surface roughness of various separators. For these measurements, various separators were wound around various cores, and the unevenness transferred from the cores to the separators was measured as surface roughness of the separators.

For these measurements, layered separators produced via the method described below were used.

(Production of Separator Including Functional Layer)

Production of Polyolefin Porous Film

A polyolefin porous film was produced as follows. High molecular weight polyethylene powder (GUR4032; manufactured by Ticona) was mixed with polyethylene wax having a weight-average molecular weight of 1,000 (FNP-0115; manufactured by Nippon Seiro Co., Ltd.) at a weight ratio of 70% to 30%, respectively. A total of 100 parts by weight of the mixture of high molecular weight polyethylene and polyethylene wax was then mixed with (i) 0.4 parts by weight of an oxidation inhibitor (Irg1010; manufactured by Ciba Specialty Chemicals), (ii) 0.1 parts by weight of another oxidation inhibitor (P168; manufactured by Ciba Specialty Chemicals), and (iii) 1.3 parts by weight of sodium stearate. To the mixture, calcium carbonate (manufactured by Maruo Calcium Co., Ltd.) having an average particle diameter of 0.1 μm was added such that the calcium carbonate constituted 38% of the whole mixture by volume. The resulting mixture was mixed in powder form in a Henschel mixer and was subsequently melt-kneaded in a biaxial kneader to obtain a polyolefin resin composition. The polyolefin resin composition was rolled into a sheet using a pair of rollers at a surface temperature of 150° C. Calcium carbonate was removed from the sheet by immersing the sheet in an aqueous hydrochloric acid solution (4 mol/L of hydrochloric acid, 0.5% by weight of nonionic surfactant). The sheet was then drawn at 105° C. by a factor chosen as necessary into a polyolefin porous film with a film thickness of 13.5 μm.

<Production of Slurry for Formation of Functional Layer>

The conditions of production of para-aramid for providing a heat-resistant functional layer are as follows.

A para-aramid (poly(paraphenylene terephthalamide)) was produced using a separable flask, the separable flask having a capacity of 3 L and having a stirring blade, a thermometer, a nitrogen inflow tube, and an opening for adding powder. After the separable flask was fully dried, 2,200 g of N-methyl-2-pyrrolidone (NMP) was placed therein. Subsequently, 151.07 g of calcium chloride powder that had been vacuum-dried for 2 hours at 200° C. was added to the NMP. The temperature of the mixture was raised to 100° C. to completely dissolve the calcium chloride was into the NMP. The resultant calcium chloride solution was returned to room temperature, after which 68.23 g of paraphenylenediamine was added and completely dissolved. While the resulting solution was kept at 20° C.±2° C., 124.97 g of terephthalic acid dichloride was added to the solution. In doing so, the terephthalic acid dichloride was divided into 10 equal portions that were added one at a time at 5-minute intervals. Thereafter, the resulting solution was allowed to mature for one hour while being stirred and kept at 20° C.±2° C., resulting in a para-aramid solution with a para-aramid concentration of 6% by weight.

To 100 g of the obtained para-aramid solution, 243 g of NMP was added. The mixture was stirred for 60 minutes to obtain a para-aramid solution with a para-aramid concentration of 1.75% by weight. Separately, 6 g of alumina powder (Alumina C; manufactured by Nippon Aerosil Co., Ltd.; true specific gravity: 3.2 g/cm$^3$) was mixed with 6 g of another alumina powder (Advanced Alumina AA-03; manufactured by Sumitomo Chemical Co., Ltd.; true specific gravity: 4.0 g/cm$^3$) to obtain 12 g of an alumina powder mixture. Into the para-aramid solution with a para-aramid concentration of 1.75% by weight, 12 g of this alumina powder mixture thus obtained was mixed, and the resulting mixture was stirred for 240 minutes to obtain an alumina powder-containing para-aramid solution. The alumina powder-containing para-aramid solution thus obtained was filtered using a 1000-mesh metal screen. Thereafter, 0.73 g of calcium oxide was added to the filtrate, followed by 240 minutes of stirring to achieve neutralization. Finally, defoaming of the mixture was performed under reduced pressure to obtain a slurry.

<Production of Layered Separator>

A polyolefin porous film (width: 300 mm, length: 300 m) was mounted onto a wind-off machine. Subsequently, the polyolefin porous film was drawn out from the wind-off machine, and one side of the drawn out polyolefin porous film was coated with the above-described slurry by means of a bar coater to obtain a coated film. Next, the coated film thus obtained was passed through a vessel of constant temperature and humidity (temperature: 50° C., relative humidity: 70%) to precipitate para-aramid from the layer coated on the film. The resulting film was then passed through a water washing device via which NMP and calcium chloride were removed from the film.

Thereafter, moisture was removed from the washed film by blowing hot air from a dryer onto the film while passing the film through heated rollers. Thus, a layered separator of 17 μm in thickness was obtained, the layered separator including (i) a polyolefin porous film and (ii) a heat-resistant layer (a functional layer) layered upon one side of the polyolefin porous film.

The layered separator thus obtained was slit into pieces of 60 mm in width. The pieces were then wound around cores to prepare rolls with the heat-resistant layer facing the inner side (the core side). A winding tension of 1,900 gram-force was used. The rolls were stored at room temperature for two weeks. Thereafter, the surface roughness of the polyolefin side (the outer side) of the film was measured in a direction orthogonal to the circumferential direction of the film. The measurement was made for an innermost layer (1st layer) to a 6th layer of the film being unwound from the roll form.

(Specifications of the Measurement Apparatus)

The surface roughness of various films as shown in Table 2 was measured using a non-contact surface shape measurement system (VertScan [registered trademark] 2.0 R5500GML, made by Ryoka Systems Inc.). The measurement conditions are as follows.

Objective lens: 5× (Michelson type)
Intermediate lens: 1×
Wavelength filter: 530 nm
CCD camera: ⅓ inch
Measurement mode: Wave
Image field of view: 700 μm (in a direction orthogonal to the circumferential direction)×940 μm (in the circumferential direction)
Number of connected images: 5, in a direction orthogonal to the circumferential direction.
Horizontal correction of data: Quartic
Cutoff: None (Specifications of Cores)

The cores used in Comparative Example 2a and Examples 1a to 3a are 152 mm in diameter and 65 mm in width. The material for the cores is ABS.

(Summary of Transfer of Unevenness)

In Table 2, the "Reference" value is the surface roughness of a separator before it was wound around a core.

The values appearing under "1st Layer" each indicate the surface roughness of a separator wound around a core, the surface roughness being measured at a certain position on a surface of a 1st layer of the separator which layer starts from a certain position on the outer circumferential surface of the core and ends at a position corresponding to an end of winding of the 1st layer. Note that each of the values represents the surface roughness measured at the aforementioned position of the separator after the separator is wound off the roll.

The respective values appearing under "2nd Layer" to "6th Layer" each indicate the surface roughness of a separator wound around a core, the surface roughness being measured at predetermined positions of the 2nd to 6th layers of the separator, wherein the predetermined positions correspond to the position at which the measurement for the 1st layer was carried out. That is, the measurement values for the 1st to 6th layers are values measured at the positions of the separator which positions are each spaced at an interval equivalent to one turn around the core. Note that, regarding the separator wound around the core, the position corresponding to the end of the 6th layer of the wound separator with respect to the outer circumferential surface of the core is approximately 2.5 m away from the one end of the separator which end was affixed with adhesive tape to the outer circumferential surface of the core at the start of the winding of the separator around the core, the distance of 2.5 m being measured along the length of the separator.

As shown in Table 2, the value for surface roughness of the separator in Comparative Example 2a is greater than the reference value as of the 1st layer, but is nearly the same as the reference value.

The values for surface roughness of the separators of Examples 1a and 2a are each greater than the reference value as of the 1st layer, but as of the 6th layer, each of the values is the same as the reference value. The value for surface roughness of the separator of Example 3a is greater than the reference value as of the 1st layer, but as of the 6th layer, the value nears the reference value.

Thus, even when a separator is wound around either of the cores of Examples 1a and 2a, which have a greater surface roughness than that of the core of Comparative Example 2a, unevenness of the core is not transferred to the separator at a position near the end of the 6th layer (2.5 m). Even when a separator is wound around the core of Example 3a, which has a greater surface roughness, the effect of unevenness of the core on the surface roughness of the separator is small at a position near the end of the 12th layer (approximately 5 m). As seen in Example 3a, a greater surface roughness Ra or Rq of the core enables greater reduction of the normalized peel strength NF. However, considering the effect on transference of unevenness of the core to the separator, it is preferable that a value for Ra of the core is less than 13.1 or that a value for Rq of the core is less than 15.7.

(Surface Roughness and Amount of Functional Layer Adhering to Core)

TABLE 3

|  | Ra of core (μm) | Rq of core (μm) | Amount of functional layer adhering to core |
| --- | --- | --- | --- |
| Comparative Example 2a | 1.2 | 1.4 | Large |
| Example 1a | 3.9 | 4.8 | Small |
| Example 2a | 5.2 | 6.3 | Small |
| Example 3a | 13.1 | 15.7 | Small |

Table 3 shows, with regards to the various cores shown in Table 2, (i) measured surface roughness (arithmetic mean roughness Ra and root mean square roughness Rq) and (ii) the amount of the functional layer adhering to the outer circumferential surface of the core after the separator wound thereon has been removed.

The amount of the functional layer on the core was small in Examples 1a, 2a, and 3a, but large in Comparative Example 2a.

Advantageous Effects of the Embodiments in Accordance with the Present Invention It is considered that a greater standardized peel strength NF enables a stronger force of adhesion of the functional layer of the separator to the core. Therefore, it is considered that, for the core of Comparative Example 2a, which has a high standardized peel strength NF (i.e., which has a low level of surface roughness Ra, Rq), the functional layer separated from the separator and remains adhered to the core. Conversely, for the cores of Examples 1a to 3a, which each have a high standardized peel strength NF (i.e., which each have a high level of surface roughness Ra, Rq), the force of adhesion of the functional layer to the core is small. This means that for each of the cores of Examples 1a to 3a, it is possible to easily peel a separator including a functional layer from the core with almost none of the functional layer remaining adhered to the core (with almost none of the functional layer being separated from the separator).

As shown in Table 1, in a separator roll including a core whose outer circumferential surface has a specific arithmetic mean roughness Ra, peel strength is markedly reduced compared to that of the conventional separator roll. This enables easy peeling of an adhesive and a battery separator from the outer circumferential surface of the core and thus enables reuse of the core.

Additionally, as shown in Table 1, in a separator roll including a core whose outer circumferential surface has a specific root mean square roughness Rq, peel strength is markedly reduced compared to that of the conventional separator roll. This enables easy peeling of an adhesive and a battery separator from the outer circumferential surface of the core and thus enables reuse of the core.

(Method for Producing Separator Roll)

The present invention encompasses a method for producing a separator roll 10, the method including, as shown in (a) of FIG. 4, the steps of (i) conveying a separator 12, and (ii) winding the separator 12 being conveyed around any of the abovementioned cores.

The above method enables the production of a separator roll including a core that can be reused.

(Lithium-Ion Battery)

The present invention also encompasses a lithium-ion secondary battery 1, as shown in FIG. 1, (a) to (c) of FIG. 2, and (a) and (b) of FIG. 3, including a cathode 11, an anode 13, and a separator 12 wound off from a separator roll 10, the separator roll 10 including any of the abovementioned cores, the separator 12 being arranged such that it is sandwiched between the cathode 11 and the anode 13.

A method for producing a battery (for example, the lithium-ion secondary battery 1) according to one aspect of the present invention includes the steps of (i) preparing a cathode 11 and an anode 13, (ii) winding off the abovementioned separator 12 from the abovementioned separator roll 10 and (iii) arranging the separator having been wound off such that it is sandwiched between the cathode 11 and anode 13. After these steps, the cathode 13, and separator 12, having been layered together, are cut to a size suited for a battery.

This enables reuse of the core 8 of the separator roll 10, and thus makes it possible to inexpensively provide (i) a separator roll 10 and (ii) a separator 12 wound off from the separator 10. This makes it possible to provide a lithium-ion secondary battery 1 inexpensively compared to the conventional batteries.

(Separator Roll Including a Separator, the Separator Including a Functional Layer)

The present invention further encompasses a separator roll 10 including a separator 12 that is a heat-resistant separator, the separator 12 including a heat-resistant layer 4 as shown in (a) and (b) of FIG. 3, the heat-resistant layer 4 facing the outer circumferential surface S of the core 8.

The present invention still further encompasses a separator roll including a separator 12 that is an adhesion separator, the separator 12 including an adhesion layer, the adhesion layer facing the outer circumferential surface S of the core 8. One example of this adhesion layer is a layer formed by applying a coating solution of adhesive resin such as polyvinylidene fluoride to a porous film 5.

Since the heat-resistant layer 4 and the adhesion layer have greater adhesiveness than the porous film 5, they easily adhere to and remain on the outer circumferential surface S of the core 8. For this reason, in some cases, a separator including a functional layer such as a heat-resistant layer 4 or an adhesion layer can hinder reuse of a core due to adherence of the functional layer to the core. The present invention makes it possible to prevent adherence of the functional layer to the core.

(Fixing of One End of the Separator)

As shown in (b) and (d) of FIG. 6, one end of the separator 12, the one end being in contact with the outer circumferential surface S, is fixed to the outer circumferential surface S.

This makes it possible to prevent misalignment of the separator 12 on the outer circumferential surface S. Particularly, with the configuration in which one end of the separator 12 is fixed to the outer circumferential surface S before the separator 12 is wound around the core 8, it is possible to prevent the separator 12 from displacing from a fixed position of the separator 12 during winding of the separator 12 around the core 8. This enables the provision of a separator roll 10 that allows for reuse of a core 8 and causes little winding misalignment.

[Additional Remarks]

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention can also be used in (i) a film roll in which a general-purpose film other than a battery separator is wound around a core, (ii) a method for producing such a film roll, and (iii) a product that is not a lithium-ion secondary battery but is adaptable to a wide variety of general-purpose applications utilizing a film.

REFERENCE SIGNS LIST

1 Lithium-ion secondary battery (battery)
4 Heat-resistant layer (functional layer)
5 Porous film
8, u, l Core
10 Separator roll
11 Cathode
12 Separator (battery separator)
13 Anode
S Outer circumferential surface

The invention claimed is:

1. A separator roll comprising:
a porous battery separator; and
a core around which the battery separator is wound,
the core having an outer circumferential surface whose root mean square roughness is not less than 4.0 μm, the outer circumferential surface being in contact with the battery separator.

2. The separator roll according to claim 1, wherein one end of the battery separator is fixed to the outer circumferential surface, the one end being in contact with the outer circumferential surface.

3. The separator roll according to claim 1, wherein the battery separator comprises a functional layer, and wherein the battery separator is wound around the core such that the functional layer is in contact with the outer circumferential surface of the core.

4. The separator roll according to claim 1, wherein a material for the core includes resin.

5. A method for producing a battery, the method comprising the steps of:
winding off the battery separator from the separator roll according to claim 1; and
arranging the battery separator having been wound off such that it is sandwiched between a cathode and an anode.

6. The separator roll according to claim 1, wherein the battery separator includes a porous film containing polyolefin.

7. The separator roll according to claim 6, wherein the battery separator includes, as a functional layer, a heat-resistant layer containing a heat-resistant resin, which heat-resistant layer is formed on a surface of the porous film.

8. The separator roll according to claim 1, wherein the core contains at least one resin selected from the group consisting of ABS resin, polyethylene resin, polypropylene resin, polystyrene resin, and vinyl chloride resin.

9. The separator roll according to claim 1, wherein the outer circumferential surface of the core has a root mean square roughness of not less than 6.3 μm.

10. The separator roll according to claim 1, wherein the outer circumferential surface of the core has a root mean square roughness of not greater than 15.7 μm.

11. A method for producing a separator roll, the method comprising the steps of:
conveying a porous battery separator; and
winding the battery separator being conveyed around a core, the core having an outer circumferential surface whose root mean square roughness is not less than 4.0 μm.

12. The method according to claim 11, wherein the outer circumferential surface of the core has a root mean square roughness of not less than 6.3 μm.

13. The method according to claim 11, wherein the outer circumferential surface of the core has a root mean square roughness of not greater than 15.7 μm.

* * * * *